(12) United States Patent
Song et al.

(10) Patent No.: US 9,228,123 B2
(45) Date of Patent: Jan. 5, 2016

(54) TEMPERATURE SENSITIVE VISCOELASTIC WELL-TREATMENT FLUIDS

(71) Applicant: ECOLAB USA INC., Naperville, IL (US)

(72) Inventors: Jingshe Song, Sugar Land, TX (US); Jesse Vincent Mello, Missouri City, TX (US); Lulu Song, Sugar Land, TX (US)

(73) Assignee: Ecolab USA Inc., Naperville, IL (US)

( * ) Notice: Subject to any disclaimer, the term of this patent is extended or adjusted under 35 U.S.C. 154(b) by 228 days.

(21) Appl. No.: 13/797,295

(22) Filed: Mar. 12, 2013

(65) Prior Publication Data

US 2014/0262293 A1 Sep. 18, 2014

(51) Int. Cl.
*E21B 43/26* (2006.01)
*C09K 8/68* (2006.01)

(52) U.S. Cl.
CPC . *C09K 8/68* (2013.01); *E21B 43/26* (2013.01); *C09K 2208/30* (2013.01)

(58) Field of Classification Search
CPC ...... C09K 8/68; C09K 2208/30; C09K 8/508; E21B 33/138; E21B 43/267; E21B 43/26
See application file for complete search history.

(56) References Cited

U.S. PATENT DOCUMENTS

| 4,432,881 | A | 2/1984 | Evani |
| 4,615,825 | A | 10/1986 | Teot et al. |
| 4,725,372 | A | 2/1988 | Teot et al. |
| 4,735,731 | A | 4/1988 | Rose et al. |
| 5,551,516 | A | 9/1996 | Norman et al. |
| 5,964,295 | A | 10/1999 | Brown et al. |
| 5,979,555 | A | 11/1999 | Gadberry et al. |
| 6,232,274 | B1 | 5/2001 | Hughes et al. |
| 6,417,268 | B1 | 7/2002 | Zhang et al. |
| 7,081,439 | B2 | 7/2006 | Sullivan et al. |
| 2002/0161087 | A1* | 10/2002 | Heitz et al. ............ 524/379 |
| 2005/0107503 | A1 | 5/2005 | Couillet et al. |
| 2009/0023616 | A1 | 1/2009 | Couillet et al. |

FOREIGN PATENT DOCUMENTS

CA 1298697 C 4/1992

OTHER PUBLICATIONS

International Search Report and Written Opinion issued for PCT/US2014/020435, dated Jun. 17, 2014, 17 pages.
Schild, H. G., et al., "Interaction of Poly(N-isopropylacrylamide) with Sodium n-Alkyl Sulfates in Aqueous Solution," Langmuir, 1991, pp. 665-671, vol. 7, No. 4.
Shashkina, J. A., et al., "Rheology of Viscoelastic Solutions of Cationic Surfactant. Effect of Added Associating Polymer," Langmuir, 2005, pp. 1524-1530, vol. 21, No. 4.
Taylor, K. C., et al., "Water-Soluble Hydrophobically Associating Polymers for Improved Oil Recovery: A Literature Review," Journal of Petroleum Science & Engineering, 1998, pp. 265-280, vol. 19.

* cited by examiner

*Primary Examiner* — Zakiya W Bates
(74) *Attorney, Agent, or Firm* — Senniger Powers LLP (57) ABSTRACT

The present invention is directed to fracturing fluids having temperature-sensitive viscosities. The fracturing fluids may include a mixture of a hydrophobically associative polymer (HAP) and a surfactant in an aqueous medium, wherein the surfactant imparts a critical solution temperature (CST) to the fluid. The fluid is more viscous at temperatures lower than the CST as compared to temperatures above the CST.

19 Claims, 6 Drawing Sheets

(a) in Tap water (b) in 2% KCl

TEMPERATURE SENSITIVE VISCOELASTIC WELL-TREATMENT FLUIDS

FIELD OF THE INVENTION

The present invention relates to the development and use of a temperature sensitive viscoelastic fracturing fluid for use in the recovery of hydrocarbons.

BACKGROUND OF THE INVENTION

Fracturing, or hydraulic fracturing, involves the injection of specialized fluids into geologic formations to create fractures. These fractures, in combination with flow paths drilled by wellbores, allow hydrocarbons, such as oil or natural gas, to flow from the deep recesses of the geologic formations to the ground surface. The injected specialized fluids are called fracturing fluids, which carry proppant into the fractures.

For many years, fracturing fluid technology centered on a wide range of polymers such as guar, hydroxypropyl guar (HPG) and hydroxyethylcellulose (HEC). Cross-linked polymer gels, such as those based on guar crosslinked with borate or polymers crosslinked with metal ions, were also used to attain a sufficient fluid viscosity and thermal stability in high temperature reservoirs. Since high viscosities are needed to carry the required amount of proppant, high concentrations of polymer are used. At higher polymer concentrations, several problems can occur, the most serious being unwanted residual damage to the formation face and proppant pack, plugging off possible permeable pore throats due to unbroken gels. Even with the use of advanced breaker systems, large amounts of residuals can be left behind.

Recently polymer-free viscoelastic surfactants (VES) were used for aqueous drilling and treating fluids. These VES materials are advantageous over the use of polymer gelling agents, since they are low molecular weight surfactants, in that they are less damaging to the formation, leave no filter cake on the formation face, leave very little coating on the proppant, and don't create microgels or "fish-eyes". VES-gelled fluids are an improvement over polymer-gelled fluids from the perspective of being easier to clean up the residual gel materials after the fluid viscosity is broken and the fluid flowed back.

Viscoelastic surfactant molecules, when present at a sufficient concentration, can aggregate into overlapping worm- or rod-like micelles, which confer the necessary viscosity to the fluid to carry the proppant during fracturing. At very high shear rates, e.g., above 170 $s^{-1}$, the viscosity can decrease, allowing the fluid to be pumped down the wellbore. Viscoelastic surfactant fluids are disclosed, notably, in the patents published under the numbers U.S. Pat. No. 4,615,825, U.S. Pat. No. 4,725,372, U.S. Pat. No. 4,735,731, CA-1298697, U.S. Pat. No. 5,551,516, U.S. Pat. No. 5,964, 295, U.S. Pat. No. 5,979,555 and U.S. Pat. No. 6,232,274, which are all fully incorporated by reference. One well-known polymer-free aqueous fracturing fluid comprising a viscoelastic surfactant, which has been commercialized by the company group Schlumberger under the trade designation CLEARFRAC, is a mixture of the quaternary ammonium salt N-erucyl-N,N-bis(2-hydroxyethyl)-N-methyl ammonium chloride with isopropanol in a brine comprised of, for example, 3 weight percent ammonium chloride and 4 weight percent potassium chloride.

On one hand, the leak-off rate of VES fracturing fluids is normally high, so they are mainly used with hydrocarbon bearing formations wherein the permeability of the formation rocks is low. In addition, On the other hand the costs incurred by the use of high-concentration VES systems in aqueous wellbore service fluids, especially fracturing fluids, are pretty high. In particular, many VES fluid systems exhibit long viscosity recovery times after experiencing prolonged high shear. Slow recovery negatively impacts drag reduction and proppant transport capability, which consequently lead to undesirably high treating pressures and risks of near wellbore screen-outs. Many additives are developed to improve the performance but with increased cost.

Polymers and surfactants are often used together in industrial formulations to take advantage of their characteristically different properties. One class of polymers which interact particularly strongly with surfactants is the class of hydrophobically modified water-soluble polymers. See U.S. Pat. No. 4,432,881 to Evani, which is fully incorporated by reference. Since contact between the hydrophobic groups and water is unfavorable, these polymers have a strong tendency to self-associate and/or to associate with surfactants. Progressive addition of surfactants which form spherical micelles typically gives rise to an increase in the viscosity of the solution, followed by a decrease in the viscosity at higher surfactant concentrations. The enhancement in viscosity is typically attributed to the formation of mixed micelles between the polymer alkyl chains and the surfactant molecules, reinforcing polymer intermolecular cross-links. The micelles solubilize alkyl groups belonging to more than one polymer chain, and the system becomes cross-linked.

High concentrations of polymer are typically used to adequately carry an appropriate amount of proppant. At higher polymer concentrations, the fracturing fluid can have a gel-like characteristic, which can result in proppant packing and the plugging of permeable pore throats. These adverse consequences have resulted in the development and use of polymer-free viscoelastic surfactants (VESs), which have been mixed with hydrophobically modified polymers to form systems used for aqueous drilling and fracturing applications. The interaction between hydrophobically modified polymers and surfactant micelles forms a hydrocarbon-responsive fluid that breaks down upon contact with hydrocarbons. The VESs often require expensive additives to overcome VES systems that exhibit long viscosity recovery times, shearing issues, and undesirable and expensive high pressure treatment requirements.

Unfortunately, the use of fluids with hydrophobically-modified polymers in the prior art presents a significant practical limitation. Hydrophobically-modified polymers can have a slow hydration rate, making the onsite preparation of fluids containing them difficult and slow to prepare, especially at the injection well bore.

Accordingly, there is a need for fracturing fluids that are readily hydratable, have viscosity properties that enable efficient and inexpensive pumping and proppant transport down boreholes, and that reduce or avoid damage to subterranean formations harboring reservoir hydrocarbon fluids.

SUMMARY OF INVENTION

The present invention is an improvement to the general technique of micellar polymerization by carefully controlling the type and the level of the added surfactants according to the end use. The level of surfactant may decrease significantly by 15 to 100 times. This optimized low level of surfactant in the final product not only could decrease the cost of the final product, but also provide better performance than the purified HAP itself. The present invention provides products that hydrate in water quickly, and the resulting fracturing fluids have excellent proppant transport properties and reduce the damage to subterranean formations.

The present invention is directed to a fracturing fluid composition comprising a hydrophobically associative polymer (HAP), wherein the polymer is water-soluble, but comprises two or more water-insoluble short blocks; and a surfactant having a critical solution temperature (CST) of between about 30° C. and 150° C. wherein the viscosity of the fracturing fluid composition is temperature sensitive. The fracturing fluid may further comprise a proppant wherein the proppant is selected from the group consisting of sand, bauxite, a ceramic, glass beads, and a combination thereof. The surfactant of the fracturing fluid may be selected from the group consisting of a cationic surfactant, a nonionic surfactant, an anionic surfactant, and a zwitterionic surfactant. The anionic surfactant may comprise an alkyl chain length selected from the group consisting of 12 carbons, 14 carbons, 16 carbons, 18 carbons, and 20 or more carbons. The anionic surfactant may be sodium tetradecyl sulfate, sodium hexadecyl sulfate. The nonionic surfactant of the fracturing fluid may be selected from the group consisting of glyceryl laurate, lauryl glucoside, Tween 80, Triton X-100, sorbitan monostearate, sorbitan tristearate, stearyl alcohol, cetostearyl alcohol, poloxamer, and decyl glucoside. The zwitterionic surfactant of the fracturing fluid may be betaine such as $C_{18}$ butaine. The fracturing fluid may have a CST between about 65° C. and 70° C. in brine or between about 100° C. and 105° C. in brine or greater than about 93.3° C. (200° F.). The fracturing fluid may have a viscosity that is at least 10000 cP, at 0.1 Pa, at temperatures up to and including 93.3° C. (200° F.).

The surfactant of the fracturing fluid is water soluble at temperatures above the CST and water insoluble below the CST. The hydrophobically associative polymer of the fracturing fluid is a copolymer of one or more water soluble ethylenically unsaturated monomer with one or more water insoluble ethylenically unsaturated monomer. The water soluble ethylenically unsaturated monomer in claim 18 is selected from acrylamide, methacrylamide, acrylic acid, methacrylic acid, 2-acrylamidomethylpropanesulfonic acid, N-vinyl pyrrolidone, N-vinyl formamide, and mixtures thereof. The water insoluble ethylenically unsaturated monomer having hydrophobic properties is selected from alkyl or alkylaryl alcohol esters of acrylic or mathacrylic acid, alkyl or alkylaryl amides of acrylamide or mathacrylamide, styrene, butadiene, 1-vinylnaphthalene and mixtures thereof. The fracturing fluid may comprise a hydrophobically associative polymer that is present at between 0.001 weight percent and 5 weight percent.

The present invention is further directed to a method of increasing the CST of a fracturing fluid comprising a hydrophobically associative polymer, wherein the polymer comprises two or more blocks of two or more hydrophobic monomers, the method comprising mixing an anionic surfactant into the fracturing fluid, wherein the longer the alkyl chain length of the anionic surfactant, the higher the HCST of the resulting fracturing fluid.

The present invention is further directed to a method for recovering hydrocarbons, the method comprising providing a fracturing fluid composition comprising a hydrophobically associative polymer (HAP), wherein the polymer is water-soluble, but comprises two or more water-insoluble short blocks; and a surfactant having a critical solution temperature (CST) of between about 30° C. and 150° C.; injecting/pumping the fracturing fluid composition from a ground surface into a geologic formation/fracture, wherein the temperature of the fracturing fluid is lower than the CST of the surfactant; allowing the temperature of the fracturing fluid to rise above the CST of the surfactant when the fracturing fluid comes into contact with a hydrocarbon, thereby facilitating the flow of the fracturing fluid to the from the point of contact with the hydrocarbon; and recovering the hydrocarbon from the geologic formation/fracture at the ground surface.

The present invention is further directed to a method for preparing the fracturing fluid by micellar polymerization method comprising mixing one or more water-insoluble monomers with one or more water-soluble surfactants to form a surfactant solution including mixing the surfactant solution with an aqueous solution of one or more water-soluble monomers to form a micellar reaction solution; subjecting the micellar reaction solution to micellar polymerization conditions; diluting the resulting HAP and surfactant solutions to the fracturing fluid in claim 1; or (a) drying and grinding the resulting HAP and surfactant solutions into fine powders; and (b) dissolving the fine powders in water to make the fracturing fluids; adding salts into the fracturing fluids of step (d) and may be added between 0.1 weight percent to 15 weight percent, wherein the viscosity of the fracturing fluid is temperature sensitive due to the presence of the one or more water soluble surfactants. This method may be performed in fresh water. The method may comprise one or more water soluble surfactants that are not sodium dodecyl sulfate (SDS). The soluble surfactants of the method may be selected from one or more water soluble surfactants is selected from the group consisting of a cationic surfactant, a nonionic surfactant, an anionic surfactant, and a zwitterionic surfactant. The surfactant may be anionic and in may be sodium tetradecyl sulfate or sodium hexadecyl sulfate. The surfactant may be a zwitterionic surfactant such as betain.

DETAILED DESCRIPTION

Described herein is a fracturing fluid having a temperature-sensitive viscosity with relatively low polymer concentration and low surfactant concentration that enables the efficient recovery of reservoir hydrocarbons from subterranean formations. The fracturing fluid is stable at high shear rates and temperatures. The fracturing fluid may contain a mixture of a hydrophobically associative polymer (HAP) with short water-insoluble blocks and a surfactant in an aqueous medium, wherein the surfactant imparts a critical solution temperature (CST) to the fluid. The fluid is more viscous at temperatures lower than the CST as compared to temperatures above the CST. The fracturing fluid may further contain a proppant.

Also described herein is a method for making the fracturing fluid. One or more water-insoluble monomers may be mixed with one or more water-soluble surfactants to form a surfactant solution. The surfactant solution may then be mixed with an aqueous solution of one or more water-soluble monomers to form a micellar reaction solution. The micellar reaction solution may then be subjected to micellar reaction conditions to form the fracturing fluid.

The CST of the fracturing fluid may be modulated by adding one or more anionic surfactants to the mixture. Longer alkyl chain lengths of the anionic surfactant may correspond to an ability to raise the CST higher than CSTs that could be obtained with anionic surfactants having shorter alkyl chain lengths.

Also described herein is a method for recovering hydrocarbons from a geological formation. To recover the hydrocarbons, the fracturing fluid may be injected into the geological formation at temperatures below the CST of the fluid. Upon contact between the fracturing fluid and the hydrocarbons, the temperature of the fluid is raised so as to decrease the viscosity of the fluid and allow for efficient transport of the hydrocarbons from a reservoir in the geological formation.

1. DEFINITIONS

The terminology used herein is for the purpose of describing particular embodiments only and is not intended to be limiting. As used in the specification and the appended claims, the singular forms "a," "and" and "the" include plural references unless the context clearly dictates otherwise.

The terms "hydrophobic monomer" and "water-insoluble monomer" are used interchangeably herein.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

2. FRACTURING FLUID

Figure 1:
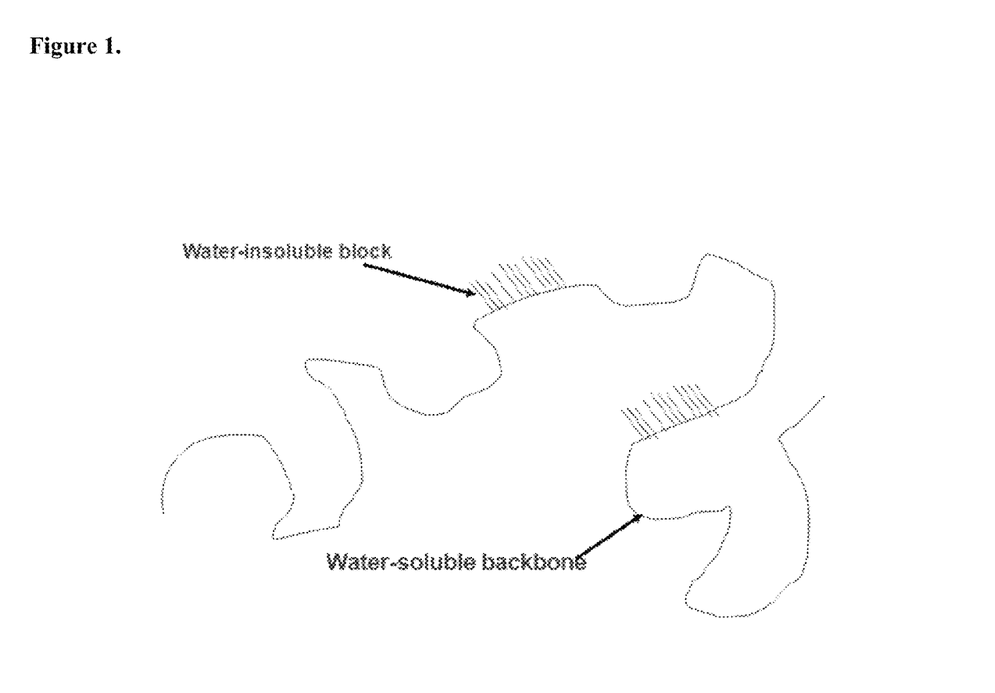
FIG. 1 shows a schematic of hydrophobically-associative polymer (HAP) produced by micellar polymerization methods.

The present invention is directed to a fracturing fluid comprising a hydrophobically associated polymer (HAP) and a surfactant. The HAP contains hydrophobic monomers arranged as block-like structures in the backbone of the polymer. The HAP may further comprise two or more water-insoluble short blocks, but overall, the HAP is water soluble. The HAP may be as shown in FIG. 1. See schematic of HAP in FIG. 1. The surfactant imparts a critical solution temperature to the fracturing fluid, whereby the viscosity of the fracturing fluid is temperature sensitive. The CST may be optimized for a specific application. The fracturing fluid may further contain a proppant.

The fracturing fluid may be pumped at a high shear rate, which lowers the viscosity of the fracturing fluid to allow for its efficient pumping down the wellbore. As the fracturing fluid reaches a fracture, the temperature of the fluid may be decreased to below the CST and/or the fracturing fluid may be subjected a low shear rate. The fracturing fluid may exhibit a shear thinning characteristic, wherein it is stable at high shear rates due to its low viscosity at these higher rates. The temperature within the fracture or fracture area may increase the temperature of the fluid to above the fluid's CST, thereby reducing it viscosity to let proppants settle and the hydrocarbon fluid to flow back to the surface.

The fracturing fluid may be useful as a mobility control fluid in secondary or tertiary oil recovery systems, in cement applications, and/or in drilling mud formulations.

a. Hydrophobically-Associative Polymer (HAP)

The fracturing fluid contains a HAP. The HAP has a principal backbone and, grafted on the principal backbone in blocks of 2 or more hydrophobic monomers or pendant hydrophobic chains. Overall the HAP is water soluble. The blocks of 2 or more hydrophobic monomers or pendant hydrophobic chains may be short blocks and have a length of 2, 3, 4, 5, 6, 7, 8, 9, 10, 11, 12, 13, 14, 15, 16, 17, 18, 19 or 20 hydrophobic monomers. The principal backbone may be synthesized with varying degrees of hydrophobic monomer substitution or incorporation. The hydrophobic monomers or pendant hydrophobic chains may be at a substitution range of between 0.01 and 10 weight percent. The substitution range may be between 0.05 and 10 weight percent, between 1 and 9 weight percent, between 2 and 8 weight percent, between 3 and 7 weight percent, between 4 and 6 weight percent, between 0.03 and 5 weight percent, between 0.08 and 5 weight percent, between 1 and 4 weight percent, or between 1 and 3 weight percent.

The charges may be positive or negative and may be located on the polymer backbone or on the pendant hydrophobic chains or on the hydrophobic monomers.

The pendant hydrophobic chains may be fully or partially saturated linear or branched hydrocarbon chains comprising greater than 10 carbons, 12 carbons, 14 carbons, 16 carbons, 18 carbons, 20 carbons, 22 carbons, or 24 carbons. The hydrocarbon chain may comprise between 10 and 36 carbons, between 12 and 36 carbons, between 12 and 28 carbons, between 12 and 24 carbons, between 12 and 20 carbons, between 10 and 20 carbons, or between 10 and 16 carbons. The hydrophobic chains may include a cleavable or degradable group such as an acetyl, an amide, an ether bond, or an ester bond.

The principal backbone of the HAP may be water-soluble and may be synthetic, or of a biological nature. The synthetic backbone may be, for example, polyacrylamide, polymethacrylamide, poly(acrylic acid), poly(acrylamide/acrylic acid), poly(methacrylic acid), poly(butadiene/maleic acid), poly(ethyl acrylate/acrylic acid), poly(vinyl alcohol), poly (ethylene glycol), poly(styrenesulfonic acid), poly(N-vinylpyrrolidone), poly(vinylsulfonic acid), poly(2-vinylpyridine N-oxide), poly(2-hydroxypropyl methacrylate), poly(2-hydroxyethyl methacrylate/methacrylic acid), or poly(2-methacryloxyethyltrimethylammonium bromide). The principal backbone may be formed from polymerization of one or more hydrophilic monomers, for example. A water-soluble copolymer may be formed from the polymerization of sodium-2-acrylamido-2-methyl propane sulfonate (NaAMPS) and acrylamide, for example.

The HAP may be a copolymer of one or more water soluble ethylenically unsaturated monomers with one or more water insoluble ethylenically unsaturated monomers. The HAP may be charged or non-charged. The water soluble ethylenically unsaturated monomer is selected from acrylamide, methacrylamide, acrylic acid, methacrylic acid, 2-acrylamidomethylpropanesulfonic acid, N-vinyl pyrrolidone, N-vinyl formamide, and mixtures thereof. The water insoluble ethylenically unsaturated monomer having hydrophobic properties is selected from alkyl or alkylaryl alcohol esters of acrylic or matharcylic acid, alkyl or alkylaryl amides of acrylamide or mathacrylamide, styrene, butadiene, 1-vinylnaphthalene or mixtures thereof.

A HAP principal backbone that is of a biological nature may be a polysaccharide. The polysaccharide may be starch or a starch derivative such as starch phosphate, starch succinate, aminoalkyl starch or hydroxypropyl starch; cellulose or cellulose derivatives such as carboxymethyl cellulose, methyl cellulose, ethyl cellulose or hydroxpropylmethyl cellulose; chitin or chitin derivatives such as N-carboxybutyl chitosan or N-carboxymethyl chitosan; galactomannans such as guar and guar derivatives. Guar derivatives may include carboxymethyl guar or carboxymethyl hydroxypropyl guar derivatives.

The HAP may have an average molecular weight of between 10,000 g/mol and 10,000,000 g/mol. The average molecular weight may be between 50,000 g/mol and 9,000,000 g/mol, between 75,000 g/mol and 8,500,000 g/mol, between 100,000 g/mol and 2,000,000 g/mol, between 100,000 g/mol and 5,000,000 g/mol, between 100,000 g/mol and 3,500,000 g/mol, between 75,000 g/mol and 1,500,000 g/mol, between 75,000 g/mol and 1,000,000 g/mol, between 75,000 g/mol and 750,000 g/mol, between 100,000 g/mol and 400,000 g/mol, between 100,000 g/mol and 300,000 g/mol, or between 100,000 g/mol and 200,000 g/mol.

The HAP may be present in the fracturing fluid at between 0.001 and 5 weight percent, between 0.005 and 4 weight percent, between 0.01 and 3 weight percent, between 0.05 and 2 weight percent, between 0.1 and 1 weight percent, between 0.5 and 3 weight percent, between 1 and 4 weight percent, between 2 and 5 weight percent, between 3 and 5 weight percent, or between 1 and 5 weight percent.

The chemical structure of the pendant hydrophobic chains may correspond to and/or match the hydrophobic tail of the surfactant molecules of the fluid. In such case, the whole chemical structure of the pendant hydrophobic chain and its associated carboxyl group may form an amphiphilic structure corresponding to or matching the surfactant molecule structure, whereby the carboxylic group is analogous to the charged hydrophilic head of the surfactant molecule.

b. Surfactant

The fracturing fluid contains a surfactant. The surfactant may be any surfactant, such as a cationic surfactant, a nonionic surfactant, an anionic surfactant, or a zwitterionic surfactant. The surfactant may be a mixture of two or more of a cationic surfactant, a nonionic surfactant, an anionic surfactant, or a zwitterionic surfactant. The surfactant may not be sodium dodecyl sulfate. The surfactant may have a desired CST. When the surfactant is cationic, it is associated with a negative counterion, which can be an inorganic anion such as a sulfate, a nitrate, a perchlorate or a halide such as $Cl^-$, $Br^-$ or with an aromatic organic anion such as salicylate, naphthalene sulfonate, p and m chlorobenzoates, 3,5 and 3,4 and 2,4-dichlorobenzoates, t-butyl and ethyl phenate, 2,6 and 2,5-dichlorophenates, 2,4,5-trichlorophenate, 2,3,5,6-tetrachlorophenate, p-methyl phenate, m-chlorophenate, 3,5,6-trichloropicolinate, 4-amino-3,5,6-trichlorpicolinate, 2,4-dichlorophenoxyacetate.

When the surfactant is anionic, it is associated with a positive counterion, for example, $Na^+$ or $K^+$. The anionic surfactant may be sodium tetradecyl sulfate or sodium hexadecyl sulfate, for example. The anionic surfactant may be a monocarboxylate $RCOO^-$ such as oleate, where R is $C_{17}H_{33}$ or di- or oligomeric carboxylates. The mono-, di- or oligomeric carboxylates may form viscoelastic gels when in alkaline solution in the presence of added salts, such as potassium chloride (KCl) or sodium chloride (NaCl).

When the surfactant is nonionic, it is not associated with an electrical charge. The nonionic surfactant may be glyceryl laurate, lauryl glucoside, Tween 80, Triton X-100, sorbitan monostearate, sorbitan tristearate, stearyl alcohol, cetostearyl alcohol, poloxamer, or decyl glucoside, for example.

When the surfactant is a zwitterionic, it is associated with both negative and positive counterions, for example, $Cl^-$ and $Na^+$ or $K^+$. The zwitterionic surfactant may be betaine surfactants, which may have the general formula R—$N(R_1R_2)$—Z, where Z is an alkyl group or R—$CN(R_1R_2R_3)$—Z, where Z is an acyl group. The hydrophobic group R can be aliphatic or aromatic, straight or branched, saturated or unsaturated. The anionic group Z of the surfactant can be —R'—$SO_3$—, —R'—COO—, where R' is a saturated aliphatic chain. $R_1$, $R_2$ and $R_3$ are each independently hydrogen or an aliphatic chain or at least one carbon atom. The betaine may be a $C_{18}$-betaine.

The surfactant may have the formula: R—Z, where R is the hydrophobic tail of the surfactant, which may be fully or partially saturated, linear or branched hydrocarbon chain of at least 9 carbon atoms and Z is the head group of the surfactant with can be —$NR_1R_2R_3^+$, —$SO_3^-$, —$COO^-$, or, —$N^+(R_1)(R_2)R_3$—$COO^-$ where $R_1$, $R_2$, and $R_3$ are each independently hydrogen or a fully or partially saturated, linear or branched, aliphatic chain or at least one carbon atom; and where $R_1$ or $R_2$ can comprise a hydroxyl terminal group. Where R is the hydrophobic tail of the surfactant, R may be 9, 10, 11, 12, 13, 14, 15, 16, 17, 18, 19, 20, 21, 22, 23, 24, 25, 26, 27, 28, 29, or 30 carbon atoms. The surfactant may be a mixture of two or more surfactants of differing hydrocarbon chain lengths.

(1) Critical Solution Temperature ("CST") of the Surfactant and Fracturing Fluid The viscosity of the fracturing fluid is temperature-dependent. At temperatures above the CST of the fracturing fluid, the solution viscosity drops sharply. At temperatures below the CST, the fracturing fluid has a very high viscosity. For example, the viscosity of the fracturing fluid at temperatures below the CST of the fracturing fluid may be 100,000 cP, 1,000,000 cP, 10,000,000 cP, 100,000,000 cP at a given pressure. At temperatures above the CST, the viscosity of the fracturing fluid may be 10, 15, 20, 25, 30, 35, 40, 45, 50, 60, 65, 70, 76, 80, 85, 90, 95, 100, 150, 200, 250, 300, 350, 400, 450, 500, 550, 600, 700, 800, 900, or 100 cP at a given pressure.

A change in temperature of the fracturing fluid may break the viscosity of the fluid. The critical solution temperature of the surfactant imparts a temperature sensitive viscosity to the fracturing fluid. The surfactant is soluble in the fracturing fluid at temperatures above the CST. At temperatures below the CST, the surfactant is well dispersed, but insoluble. Accordingly, when the fracturing fluid is heated above the CST, the surfactant becomes soluble and the hydrophobic associations between HAPs are dissolved by the surfactant. As a result, the viscosity of the fracturing fluid is lowered, thereby allowing for, and facilitating, the fracturing fluid to flow back to through the wellbore from the reservoir. For example, if the surfactant is sodium tetradecyl sulfate ($C_{14}$ alkyl groups), the fracturing fluid may have a CST of greater that 65° C. Sodium hexadecyl sulfate ($C_{16}$ alkyl groups) may correspond to a transition temperature of greater than 100° C. See Table 3.

The CST of the fracturing fluid may be between 50° C. and 150° C., between 60° C. and 140° C., between 70° C. and 130° C., between 80° C. and 120° C., between 90° C. and 110° C., between 50° C. and 70° C., between 65° C. and 70° C., between 100° C. and 105° C., between 100° C. and 110° C., or between 100° C. and 125° C.

The CST of the surfactant may be between 50° C. and 150° C., between 60° C. and 140° C., between 70° C. and 130° C., between 80° C. and 120° C., between 90° C. and 110° C., between 50° C. and 70° C., between 65° C. and 70° C., between 100° C. and 105° C., between 100° C. and 110° C., or between 100° C. and 125° C.

Figure 6:
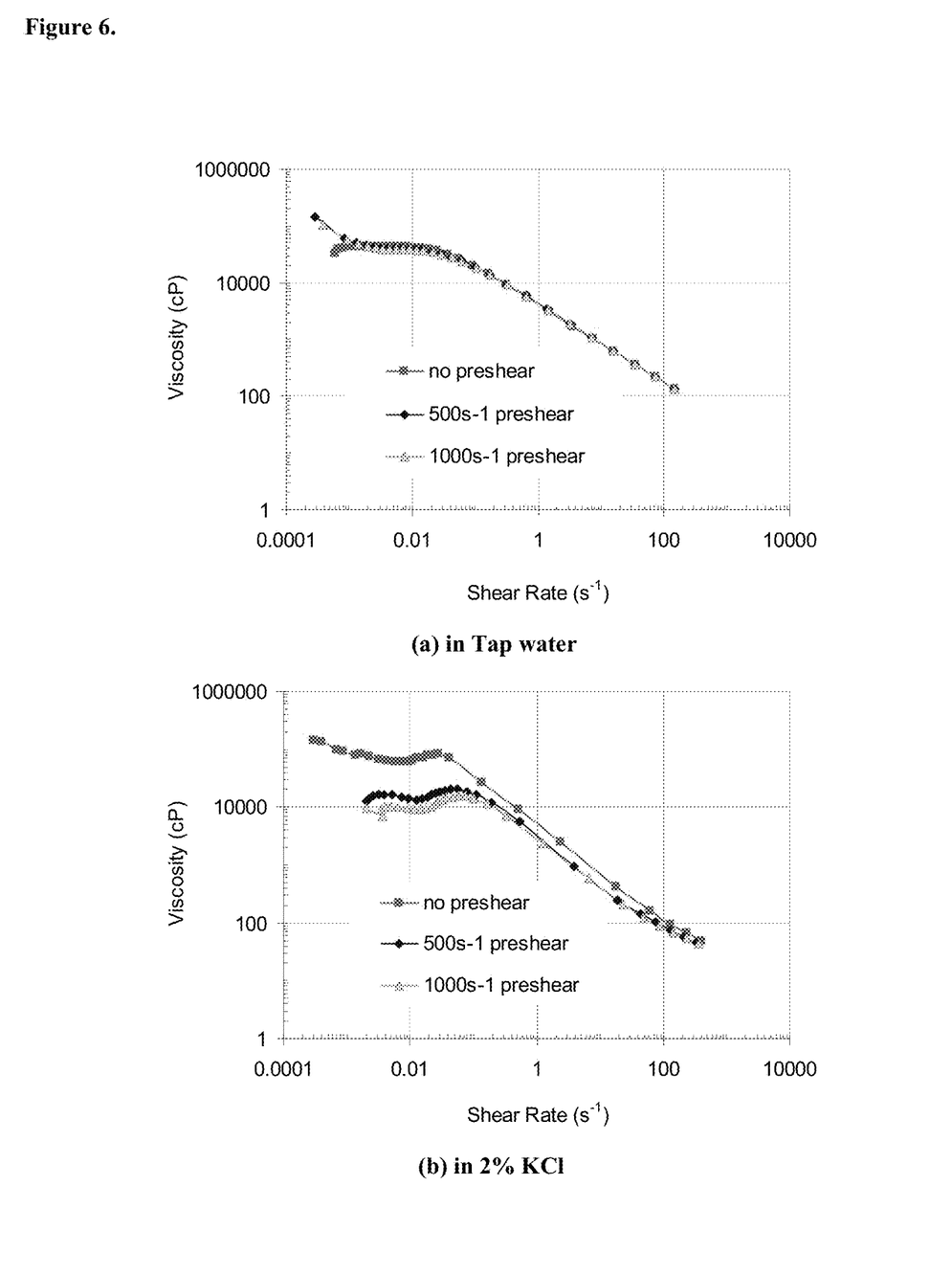
FIG. 6 shows the shear thinning characteristic of JS332-108 in tap water (a) and in 2% KCl (b).

In addition, the fracturing fluid exhibits low viscosity when it is sheared, such as when it is being pumped or in contact with a moving drill bit. When the shear action is halted, or slowed, the fracturing fluid is capable of suspending the solids it contains to prevent gravity separation. At a high viscosity and under low shear rates, the fracturing fluid is ideally suited to transport proppant into a fracture. At a low viscosity and under high shear rates, the fracturing fluid is well-suited to carry proppants down wellbores and into the geological formation. A low shear rate may be below $0.5\ s^{-1}$. A low shear rate may be $0.0001\ s^{-1}$, $0.001\ s^{-1}$, $0.01\ s^{-1}$, $0.01\ s^{-1}$, $0.02\ s^{-1}$, $0.03\ s^{-1}$, $0.04\ s^{-1}$, $0.05\ s^{-1}$, $0.1\ s^{-1}$, $0.2\ s^{-1}$, $0.3\ s^{-1}$, or $0.4\ s^{-1}$, for example. A high shear rate may be at $0.5\ s^{-1}$ or greater. A high shear rate may be greater than $0.6\ s^{-1}$, $0.8\ s^{-1}$, $1\ s^{-1}$, $10\ s^{-1}$, $s^{-1}$, $50\ s^{-1}$, $100\ s^{-1}$, $1000\ s^{-1}$, $5000\ s^{-1}$, or $10000\ s^{-1}$ for example. See FIG. 6, for example.

The viscosity of the fracturing fluid may be at least 800 cP at 0.1 Pa, 900 cP at 0.1 Pa, 1000 cP at 0.1 Pa, 1500 cP at 0.1 Pa, 2000 cP at 0.1 Pa, 2500 cP at 0.1 Pa, 3000 cP at 0.1 Pa, 3500 cP at 0.1 Pa, 4000 cP at 0.1 Pa, 4500 cP at 0.1 Pa, 5000 cP at 0.1 Pa, 5500 cP at 0.1 Pa, 6000 cP at 0.1 Pa, 6500 cP at 0.1 Pa, 7000 cP at 0.1 Pa, or 7500 cP at 0.1 Pa. The viscosity of the fracturing fluid may be between 800 cP at 0.1 Pa and 7500 cP at 0.1 Pa.

The viscosity may be measured at 20° C., 25° C., 30° C., 35° C., 40° C., 45° C., 50° C., 55° C., 60° C., 65° C., 70° C., 75° C., 80° C., 85° C., 90° C., 91° C., 92° C., 93° C., 93.1° C., 93.2° C., 93.3° C., 93.4° C., 93.5° C., 93.6° C., 93.7° C., 93.8° C., 93.9° C., 94° C., 95° C., 100° C., 105° C., 110° C., 115° C., 120° C., 125° C., 130° C., 135° C., 140° C., 145° C., 150° C., 155° C., 160° C., 165° C., 170° C., 175° C., 180° C., 185° C., 190° C., 195° C., or 200° C. The viscosity may be measured at between 20° C. and 200° C.

c. Proppant

The fracturing fluid may further contain a proppant. The proppant may be sand, bauxite, a man-made ceramic, glass beads, or a combination thereof, for example. The sand may be silica sand or resin-coated sand. These vary depending on the type of permeability or grain strength needed for a particular application. Sand containing naturally radioactive minerals may be used so that the fracture trace along the wellbore can be measured. The proppant may be between 10 and 50 mesh, 15 and 45 mesh, 20 and 40 mesh, 25 and 35 mesh, 27 and 33 mesh, or between 20 and 40 mesh.

d. Other Components in Fracturing Fluid

In addition to the HAP and the surfactant, the fracturing fluid may contain salts including, for example, inorganic salts. The inorganic salts may be chlorides of ammonium, sodium, and potassium. The salts may be organic, such as sodium salicylate. The salt may be potassium chloride (KCl). The KCl may be 1-5% weight percent. The salts may be present in concentrations of between 0.05 and 12 weight percent, between 0.1 and 11 weight percent, between 0.5 and 10 weight percent, between 1 and 9 weight percent, between 2 and 8 weight percent, between 3 and 7 weight percent, between 4 and 6 weight percent, between 0.1 and 15 weight percent, between 0.1 and 12 weight percent, or between 0.1 and 10 weight percent. The salt may be present at 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 3.4, 3.5, 3.6, 2.7, 2.8, 2.9, or 3.0 weight percent, for example. The salts may be added to a concentrated fracturing fluid prepared in fresh water. The salts may be 0.1%, 0.2%, 0.3%, 0.4%, 0.5%, 0.6%, 0.7%, 0.8%, 0.9%, 1%, 2%, 3%, 4%, 5%, 6%, 7%, 8%, 9%, 10%, 11%, 12%, 13%, 14%, 15%, 16%, 17%, 18%, 19% or 20% weight percent of the fracturing fluid.

Radioactive tracers may be added to the fracturing fluid. Such tracers may be used to determine the injection profile and location of fractures created by fracturing. The tracer may be a gamma-emitting isotope, such as gold-198, xenon-133, iodine-131, rubidium-86, chrominum-51, iron-59, antimony-124, strontium-85, cobalt-58, iridium-192, scandium-46, zinc-65, silver-110 cobalt-57, cobalt-60, iodine-131, scandium-46, zirconium-95, iridium-192, and krypton-85, for example.

3. METHOD OF MANUFACTURING THE FRACTURE FLUID

The present invention is also directed to a method for making the fracturing fluid. One or more water-insoluble monomers may be mixed with one or more water soluble surfactants to form a surfactant solution. The surfactant solution may then be mixed with an aqueous solution of one or more water-soluble monomers to form a micellar reaction solution. The micellar reaction solution may then be subjected to polymerization conditions to generate the resulting HAP and surfactant solutions as described above. The polymerization conditions may be suitable for micellar polymerization. The resulting HAP and surfactant solution are diluted into the overall fracturing fluid; or dried and grinded into a fine powder. The fine powder is dissolved in water to make the fracturing fluids as described above. Salts as described above are added into the diluted or dried powder based fracturing fluid.

a. Surfactant Solution

The surfactant solution may be a mixture of a water-insoluble monomer and a surfactant. The surfactant may be water-soluble.

As described above, the water-insoluble monomer may be any monomer that contains linear or branched hydrocarbon chain. The hydrocarbon chain may be partially or fully saturated and comprise greater than 10 carbons, 12 carbons, 14 carbons, 16 carbons, 18 carbons, 20 carbons, 22 carbons, or 24 carbons. The hydrocarbon chain may comprise between 10 and 36 carbons, between 12 and 36 carbons, between 12 and 28 carbons, between 12 and 24 carbons, between 12 and 20 carbons, between 10 and 20 carbons, or between 10 and 16 carbons. The number and length of blocks of hydrophobic groups may be manipulated by adding different types of hydrophobic monomers and/or adjusting the ratio of surfactant/hydrophobic monomer, etc. The hydrophobic monomer may be laurylacrylate or laurylmethacrylate (LMA), for example.

The surfactant may be sodium hexadecyl sulfate or, if it is a water-soluble surfactant, it may be a zwitterionic surfactant. The zwitterionic surfactant may be $C_{18}$-betaine.

b. Micellar Reaction Solution

The micellar reaction solution may be a mixture of the surfactant solution and an aqueous solution of one or more water-soluble monomers. The water-soluble monomers may be any hydrophilic monomer, such as sodium-2-acrylamido-2-methyl propane sulfonate (NaAMPS) and/or acrylamide.

c. Micellar Polymerization

The HAP may be manufactured by micellar polymerization. Micellar polymerization results in the addition of water-insoluble, or hydrophobic, monomers onto a water-soluble backbone in the form of blocks, instead of random incorporation of single monomers. Micellar polymerization is based on polymer syntheses with water-soluble monomers, hydrophobic monomers, and water-soluble surfactants. The water-soluble surfactant may form micelles around the water-insoluble monomer.

The water-soluble monomers may be soluble in the aqueous solution. The micellar polymerization reaction may proceed by the addition of an initiator to the micellar reaction solution. The initiator may be water-soluble. When heat is applied to the solution, free radicals may be formed and initiate the polymerization of water-soluble monomers. The micelles may provide microdomains where water-insoluble monomers concentrate. The micellar polymerization process results in the addition of the water-insoluble monomers onto the hydrophilic backbone of the water-soluble monomers in blocks, instead of as single water-insoluble monomers that are incorporated in random order.

The formed polymers may be characterized by the number of water-insoluble monomers per micelle. This number may be referred to as the $N_H$ number and may be determined from the following equation.

$$N_H = [\text{Water-insoluble monomers}]/[\text{Micelles}] = [\text{Water-insoluble monomers}]/([\text{surfactant}] - cmc/N_{agg})$$

wherein cmc is the critical micellar concentration of surfactant and $N_{agg}$ is a surfactant aggregation number. A higher $N_H$ value corresponds to an increased number of water-insoluble monomers that are incorporated into the polymer, which results in a higher degree of blocking A lower $N_H$ value may result in a more even distribution of water-insoluble monomers along the backbone.

Micellar polymerization may provide for the synthesis of HAPs having the level of water-insoluble monomer substitution, but with different degrees of blocking. This may allow for the production of HAPs having different rheological characteristics. Hydrophobic interactions may be modulated by changing $N_H$ values.

The micellar reaction solution may be subjected to polymerization conditions, whereby the fracturing fluid is produced. The polymerization conditions may include the addition of an initiator. The polymerization conditions may include a temperature of between 30° C. and 100° C., between 40° C. and 90° C., between 50° C. and 80° C., between 60° C. and 70° C., or between 50° C. and 70° C. The polymerization conditions may include a temperature of 50° C., 51° C., 52° C., 53° C., 54° C., 55° C., 56° C., 57° C., 58° C., 59° C., 60° C., 61° C., 62° C., 63° C., 64° C., 65° C., 66° C., 67° C., 68° C., 69° C., or 70° C.

The initiator may be a water-soluble initiator. The initiator may be a free radical initiator, such as V-50, a water-soluble peroxide, a water-soluble Azo initiator, or redox. The initiator may be sodium persulfate.

4. METHOD OF CHANGING THE CST OF A FRACTURING FLUID

The present invention is also directed to increasing the CST of a fracturing fluid. The CST of the fracturing fluid may be increased by mixing into the fracturing fluid a surfactant having an alkyl chain length greater than the length of the alkyl chains present on the surfactant of the fracturing fluid. The longer the alkyl chain length of the anionic surfactant, the higher the CST of the resulting fracturing fluid. Again, for example, if the surfactant is sodium tetradecyl sulfate ($C_{14}$ alkyl groups), the fracturing fluid may have a CST of greater that 65° C. Sodium hexadecyl sulfate ($C_{16}$ alkyl groups) may correspond to a transition temperature of greater than 100° C. See Table 3 as presented in Example 4.

5. METHOD OF RECOVERING HYDROCARBONS AND OTHER RESOURCES

The present invention is also directed to a method for recovering hydrocarbons. This recovery may be via hydraulic fracturing. The fracturing fluid may be pumped down a wellbore and into a geologic formation. The fracturing fluid may be pumped at a high shear rate, which lowers the viscosity of the fracturing fluid to allow for its efficient pumping down the wellbore. As the fracturing fluid reaches a fracture, the temperature of the fluid may be decreased to below the CST and/or the fracturing fluid may be subjected a low shear rate. The fracturing fluid may exhibit a shear thinning characteristic, wherein it is stable at high shear rates due to its low viscosity at these higher rates. See FIG. 6, for example. The temperature within the fracture or fracture area may increase the temperature of the fluid to above the fluid's CST, thereby reducing it viscosity to let proppants settle and the hydrocarbon fluid to flow back to the surface. If the temperature of the fracture or surrounding area is lower than the fluid's CST, the viscosity of the fluid may be lowered via the application of an external acid to break borate cross-linking, for example, or by adding peroxides or enzymes to break the backbones of the polymer HAPs.

The herein described method may be used to stimulate, for example, the production of various hydrocarbons from oil and gas wells, stimulate groundwater wells, precondition rock for caving or inducing rock to cave in mining operations, as a means to enhance waste remediation processes, usually hydrocarbon waste or spills, a method to measure the stress in the earth, and/or to extract heat to produce electricity in geothermal systems.

The equipment useful for fracturing with the fracturing fluid may include a slurry blender, a high pressure, high volume fracturing pump, and a monitoring unit. The equipment may also include a fracturing tank, storage units for handling of the proppant, low pressure flexible hoses, and gauges and meters for flow rate, fluid density, and treating pressure. Fracturing equipment may operate over a large range of pressures and injection rates. The pressures and rates may reach up to 100 megapascals and greater than 265 liters per second (9.4 cu ft/s).

The pressure and rate of the hydraulic system during the growth of a hydraulic fracture, as well as knowing the properties of the fluid and proppant being injected into the wellbore may be measured via the use of the fracturing fluid. This data, in combination with data related to the geology of the formation can be used to model information such as length, width and conductivity of a fracture, such as a propped fracture.

The present invention has multiple aspects, illustrated by the following non-limiting examples.

Example 1

Fracturing Fluid Component Characteristics

SDS vs. SHS as Surfactants

A HAP sample was prepared by micellar polymerization using SDS as the surfactant. The purified (by one time precipitation in acetone) HAP in fresh water has strong hydrophobic associations, and the solution exhibited a high Brookfield viscosity (1765 cps). See Table 1. However, when sodium dodecyl sulfate (SDS) is not removed from the resulting HAP, the directly diluted solution of the resulting HAP has a low Brookfield viscosity (28 cps), which indicates that the presence of SDS completely destroyed the hydrophobic associations in fresh water. See Table 1.

In brine, the purified HAP also has strong hydrophobic association with high Brookfield viscosity (1630 cps), while the corresponding hydrophilic polymer has very low Brookfield viscosity (usually <50 cps). For the unpurified HAP, the directly diluted solution in fresh water is transparent and clear with low viscosity (28 cps). However, when KCl was added the transparent solution immediately becomes opaque and more viscous (3850 cps). The strong hydrophobic association for HAP/SDS (unpurified HAP) system in brine indicates that SDS did not destroy the hydrophobic association. It seems that once the surfactant is insoluble in solution, the hydrophobic association will remain. See Table 2.

However, the solution viscosities of HAP/SDS in brine are temperature-dependent. When the temperature is raised to a certain point the solution viscosity drops sharply. This temperature is called higher critical solution temperature (CST). Below this temperature the polymer solution has a very high viscosity, and above this temperature the viscosity of the polymer solution becomes very low. The CST of HAP/SDS can be tuned by the salt concentration and different type of salt. See FIG. 1. The CST increases from 38° C. to 48° C. when salt KCl concentration increases from 1% to 5%.

The CST ranging from 35° C. to 48° C. may be too low for most applications. For example, the temperature may be higher than this temperature on ground and may reach 100° C. or higher underground during gas well formation. The HAP/SDS system loses high viscoelastic property in this temperature range. Therefore SDS may not be an ideal surfactant in fracturing fluids.

It was hypothesized that anionic surfactants with longer alkyl chain lengths might push the HCST to a higher level (such as >100° C.). The pure HAP solution was mixed with anionic surfactants that have different chain lengths, and the results (Table 3) showed that longer alkyl chains did give higher transition temperatures. For example, sodium tetradecyl sulfate pushed the transition temperature above 65° C. While sodium hexadecyl sulfate raised the transition temperature beyond 100° C. Accordingly, sodium hexadecyl sulfate (SHS) was tested for it compatibility with micellar polymerization.

SHS is insoluble in water at room temperature, but soluble at a higher temperature (about 60° C.). The micellar polymerization must be carried out at a temperature higher than 60° C. However the solubility of sodium hexadecyl sulfate is much lower than that of SDS even at higher temperatures. When SHS was used in the same concentration as SDS, the resulting polymer had very poor associating properties in 2% KCl solution because the polymerization system is not homogeneous. Surprisingly, it was found that better performances were obtained by decreasing SHS concentration in the reaction solution. For example, when SHS concentration was decreased by 93% or up, the resulting polymers had excellent associating properties both in water (Brookfield viscosity of 0.5 wt % polymer solution, >5000 cps (spindle 2 at 6 rpm)) and in 2% KCl solution (Brookfield viscosity of 0.5 wt % polymer solution, 4200 cps spindle 2 at 6 rpm)).

One important factor of the resulting HAP/SHS gels or dried samples has fast hydration rate, which is important for hydraulic fracturing applications. It is also important that the resulting HAP/SHS gels or dried samples have a much higher critical solution temperature (HCST) than 90° F. The HCST can be higher than 200° F., a temperature for most hydraulic fracturing. The HCST can be tuned by applying different type of surfactants.

Any surfactant, such as cationic, anionic or zwitterionic surfactant, can be suitable for this invention if the HCST of the surfactant is suitable for the final application. Zwitterionic surfactants, such as betaines, were first found to be very promising surfactants for micellar polymerization. For example, when $C_{18}$-betaine was used in micellar polymerization, only 1.1 wt % (based on total monomer) of $C_{18}$-betaine was needed while 100 wt % (based on total monomer) of SDS was needed to solubilize the same amount of the hydrophobic monomer. The resulting HAP/$C_{18}$-betaine gels or dried samples were readily soluble in water or brine with very high viscosities and excellent proppant transport properties.

Example 2

Preparation of HAP with Varying Anionic Surfactants

Figure 2:
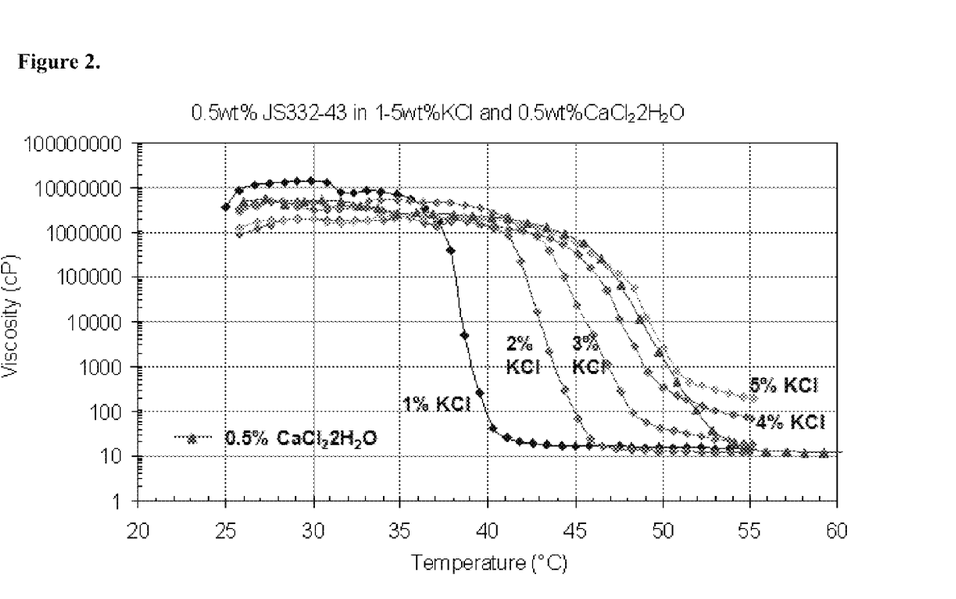
FIG. 2 shows the critical solution temperature (CST) of HAP/SDS at different KCl concentrations or with different salts.

Micellar polymerization was used to prepare polymers using sodium dodecylsulphate (SDS) as the surfactant and ammonium persulfate (APS) as the free radical initiator. Acrylamide (49.5%) 15.0 g, NaAMPS (58.0%) 15.0 g, SDS 7.93 g, and N-dodecylacrylamide (DAM) 0.18 g were added into 228 g of deionized water. The mixture was then heated to 50° C., and stirred under N2 until a clear solution was observed. 1 ml of 1 weight (wt) % APS solution was injected into the reactor. One drop of anti-foamer (R-301) was also added to prevent the formation of foam. The polymerization was conducted for 5 hours. The resulting viscous solution was marked as JS332-43 and directly used for testing the transition temperatures at different KCL concentrations or with different salt. See FIG. 2 and Tables 1 and 2 for analysis of unpurified samples.

TABLE 1

Brookfield Viscosity in Fresh Water

| | Unpurified HAP 0.5 wt % in Fresh Water | Purified HAP 0.5 wt % in Fresh Water |
|---|---|---|
| Brookfield Viscosity (cps) Spindle 2 @ 6 rpm | 28 | 1765 |

TABLE 2

Brookfield Viscosity in 2% KCl

| | Unpurified HAP 0.5 wt % in 2% KCl | Purified HAP 0.5 wt % in 2% KCl |
|---|---|---|
| Brookfield Viscosity (cps) Spindle 2 @ 6 rpm | 3850 | 1630 |

After the reaction was complete, 500 ml acetone was poured into the reactor. The polymer was immediately precipitated from the solution. The polymer was filtered, washed with acetone, and dried at room temperature in a fume-hood overnight.

To prepare the fracturing fluid, 1.0 g of purified and dried polymer (not grinded) was dissolved into 200 g of water after 5 h of stirring. 2.0 g of KCl was added into half of the solution, and the mixture as stirred or shaken for one additional minute. JS332-43 was also directly diluted to 0.5 wt % for further testing.

A series of anionic surfactants (alkyl sulfate sodium salt with $C_{12}$, $C_{14}$, $C_{16}$, respectively) were tested for effects on transition temperature. In the test, 0.375% of purified HAP (JS332-43) was dispersed in water in a 250 ml Waring blender for between about 0.5 hours and several hours. 0.375% of an alkyl sulfate sodium salt was then added and magnetically stirred for a length of time, sometimes overnight. It was found that these alkyl sulfate sodium salts were not soluble in water at room temperature. Therefore, the aqueous slurry of HAP and sulfate surfactant was heated in a water bath till the surfactant dissolved (no visible surfactant pieces and the solution also turned transparent). After cooling down, a coherent viscoelastic soft gel was obtained. Most of the time, the gel was split in half and 2% (based on the weight of the solution) of KCl was added to one of the halves. The rheological properties of the gel (in water or in 2% KCl) were measured using Malvern and Grace 5600 rheometers. The transition temperatures were recorded in Table 3. As shown, the transition temperature increased from about 40° C. to above 100° C.

TABLE 3

Transition Temperatures with Different Surfactants

| Surfactant | $C_{12}$—$SO_4^{2-}$ | $C_{14}$—$SO_4^{2-}$ | $C_{16}$—$SO_4^{2-}$ |
|---|---|---|---|
| Transition Temperature in 2% KCl | 42° C. | ~67° C. | ~100° C. |

Example 3

Preparation of HAP with $C_{18}$-Betaine as Surfactant

Micellar polymerization was used to prepare polymers using $C_{18}$-betaine as the surfactant and V-50 as the free radical initiator. Acrylamide (49.5%) 26.0 g, NaAMPS (58.0%) 107.1 g, $C_{18}$-betaine 0.81 g and laurylmethacrylate (LMA) 0.81 g were added into 114.2 g of deionized water. The mixture was then heated to 60° C., and stirred under N2 until a clear solution was observed. 1.0 ml of a 3.0 wt % V-50 solution was injected into the reactor. One drop of R-301 anti-foaming agent was also added to prevent foam formation. The polymerization was conducted for 5 h to produce a 30% active gel. The gel was then ground and dried as a fine powder and marked as "JS332-108."

Figure 3:
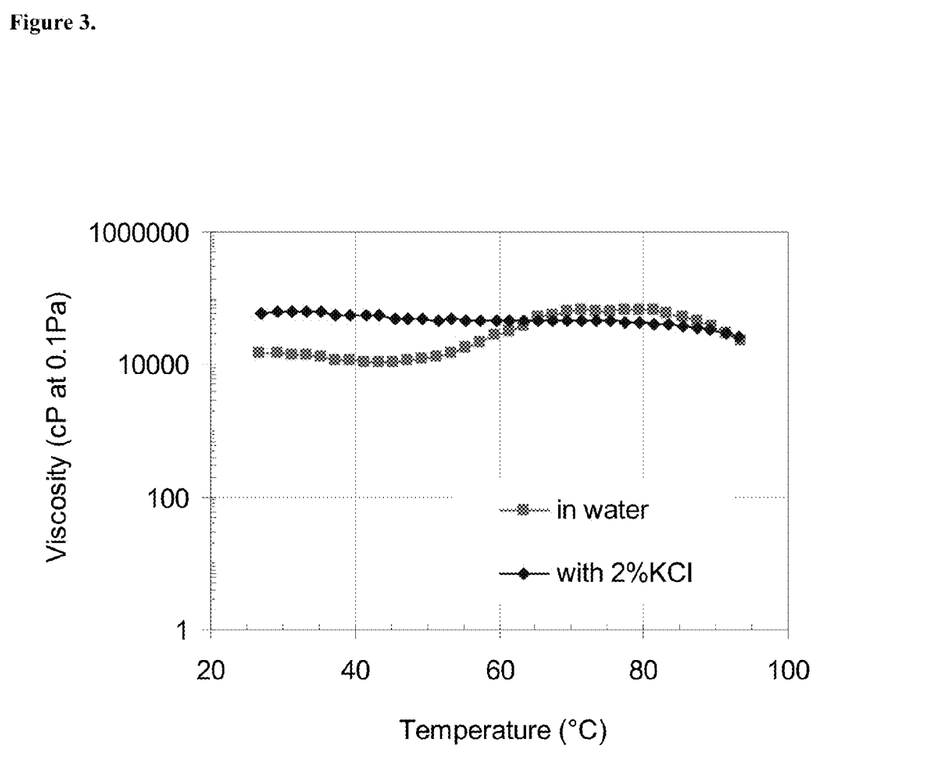
FIG. 3 shows the viscosity-temperature dependence of the HAP/$C_{18}$-betaine in 2% KCl and in water.

JS332-108 was readily soluble in water or brine with very high viscosities and excellent proppant transport properties. FIG. 3 shows the viscosity/temperature dependence of the HAP/$C_{18}$-betaine in 2% KCl, wherein a high viscosity is maintained at temperatures above 200° F. The concentration of $C_{18}$-betaine in this solution is only about 50 ppm. The performance of this relatively low concentration of $C_{18}$-betaine may be enhanced by the strong interaction between hydrophobic groups on the HAP and $C_{18}$-betaines.

Example 4

Viscosity and Regain Fracture Conductivity Testing

In field applications, a fracturing fluid needs to be removed after the proppant is delivered and sand particles or packs are placed in the fracture(s). The most common way is to reduce the viscosity of the fluid so that it can flow back to, and up, the well-bore. The breaking process of the fracturing fluid was examined by viscometry and regain fracture conductivity test.

Figure 4:
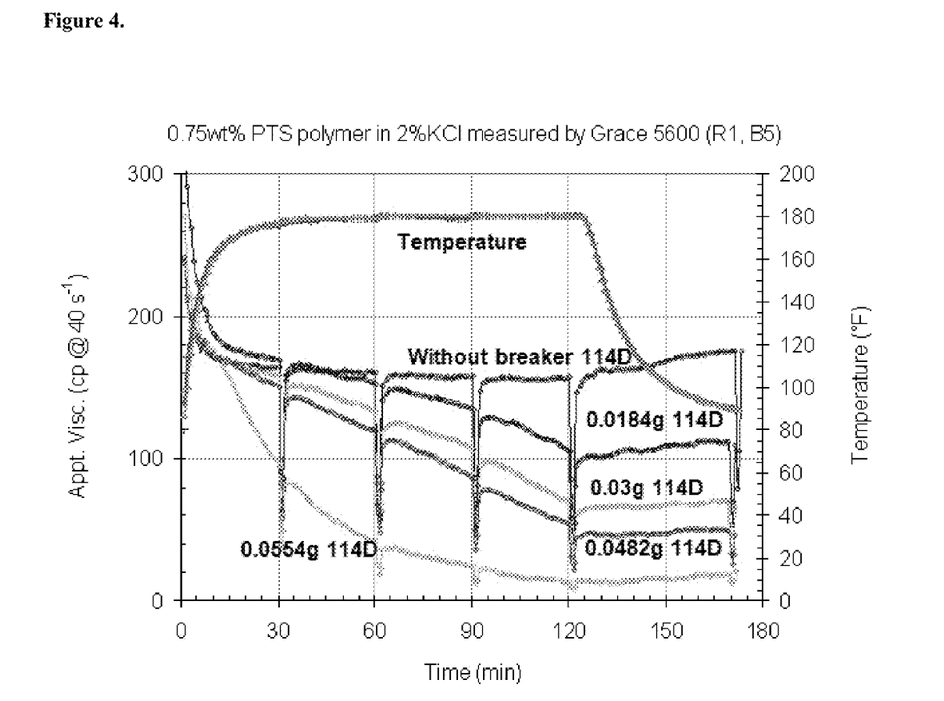
FIG. 4 shows the thermal stability of viscosity of a HAP at different levels of ammonium persulfate at 180° F. (0.75 weight % JS332-108 in 2% KCl solution). The temperature curve is the same for all five different HAP containing samples.
Figure 5:
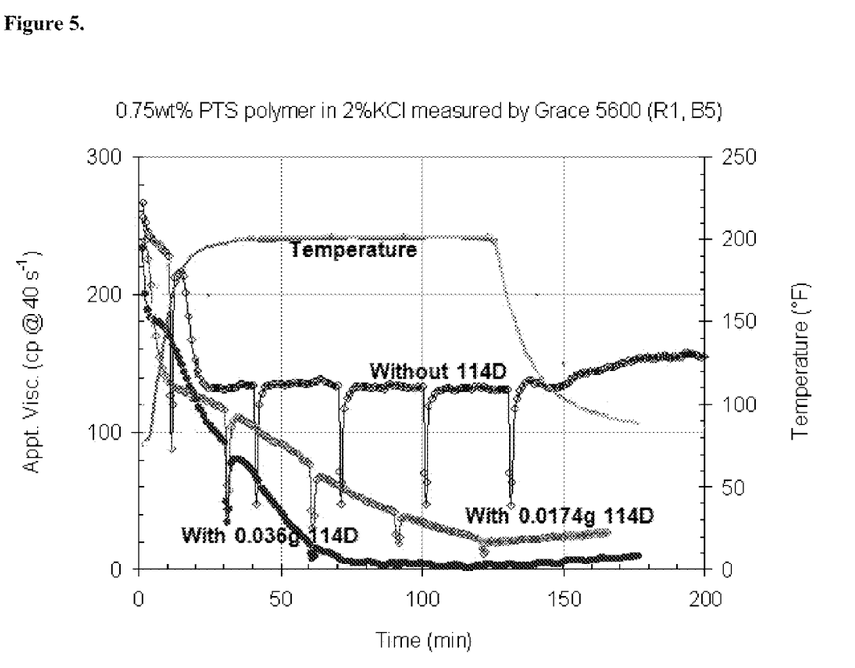
FIG. 5 shows the thermal stability of viscosity at different levels of ammonium persulfate at 200° F. (0.75 weight % JS332-108 in 2% KCl solution). The temperature curve is the same for all ammonium persulfate containing samples.

Performance of a fracturing fluid (0.75 wt % JS332-108 in 2% KCl) with encapsulated APS breaker was examined with a Grace viscometer 5600. See FIG. 4 (180° F.) and FIG. 5 (200° F.).

Regain fracture conductivity was performed on one of the HAP lab samples (0.375 wt % JS332-108 in 2% KCL) at an independent laboratory. The fracturing fluid was pumped through 1 lb/ft² proppant pack (20/40 carbolite), which provides a more severe condition (due to less pore volume) as compared to a typical long-term regain conductivity test as described, for example, by ISO 13503-5, which suggests 2 lb/ft² proppant loading. The test temperature was 180° F. and the closure stress was 4000 psi. Encapsulated APS (FWB114D) was used to break the fluid at a nominal loading of 3.3 lb/Mgal based on the rheological data obtained using the Grace rheometer.

The differential pressure to initiate flow-back of 2% KCl was 0.0144 psi/ft and the conductivity/permeability regain data at different flow-back rate/time are summarized in Table 4.

TABLE 4

2% KCl regain conductivity of 0.375 wt % JS332-108 in 2% KCl at 180° F.

| | | Baseline | | PTS Fluid | | Regain |
|---|---|---|---|---|---|---|
| Time (hrs) | Flow Rate (ml/min) | Conductivity (mDft) | Permeability (Darcy) | Conductivity (mDft) | Permeability (Darcy) | Permeability (%) |
| 0 | 0.5 | 7798 | 768 | 1236 | 117 | 15.2 |
| 0.2 | 2 | 6676 | 697 | 2035 | 218 | 31.7 |
| 1 | 2 | 6227 | 650 | 3897 | 416 | 68.2 |
| 2 | 2 | 5743 | 605 | 4723 | 511 | 83.9 |
| 5 | 2 | 5679 | 598 | 4595 | 497 | 82.7 |
| 10 | 2 | 5550 | 579 | 4376 | 469 | 80.3 |
| 15 | 2 | 5563 | 580 | 4532 | 481 | 84.1 |
| 20 | 2-10 | 5201 | 543 | 4527 | 481 | 90.2 |
| 22 | 10 | 5100 | 532 | 4757 | 510 | 96.2 |
| 24 | 20 | 4967 | 518 | 4649 | 498 | 95.6 |
| 25 | 25 | 5055 | 532 | 4515 | 484 | 92.2 |
| 50 | 2 | 5145 | 542 | 4430 | 475 | 88.1 |

A comparison of the results to the regain conductivity of some borate-crosslinked guar fluids is given in Table 5. The proppant transport system (PTS) fluid cleaned up at 180° F. even with 1 lb/ft² proppant loading.

TABLE 5

Comparison of the fracture regain conductivity data of the HAP fluid system to those of borate-crosslinked guar fluid systems. All are tested at 180° F. and 1 lb/ft² proppant loading.

| Fluid systems | | Regain Permeability (2% KCl flowback) | | | | |
|---|---|---|---|---|---|---|
| | | 1 hr 2 ml/min | 2 hrs 2 ml/min | 5 hrs 2 ml/min | 20 hrs 2-10 ml/min | 25 hrs 25 ml/min |
| 25 lb/Mgal Borate-crosslinked guar (Data from Proppant Consortium) | No Breaker | 6.7% | 6.4% | 7.8% | 11% | 17% |
| | 0.1 ppt APS | 13.4% | 12.2% | 11% | 9.4% | 18% |
| | 0.2 ppt APS | 4.6% | 4.6% | 6.7% | 7.1% | 22% |
| | 0.1 ppt APS + 5 ppt Encap HP | 12% | 19.1% | 17% | 19.3% | 30% |
| | 0.1 ppt APS + 10 ppt Encap HP | 16.4% | 16.1% | 18.4% | 16.1% | 17% |
| 30 lb/Mgal borate-crosslinked guar | 1 gpt FWB605E50 | 22.9% | 18.5% | 24.1% | 62.1% | 56.1% |
| 31 lb/Mgal PTS polymer | 3.5 ppt FWB114D | 68.2% | 83.9% | 82.7% | 90.2% | 92.2% |

The invention claimed is:

1. A fracturing fluid composition comprising
   (a) a hydrophobically associative polymer (HAP), wherein the polymer is water-soluble, but comprises two or more water-insoluble short blocks; and
   (b) a surfactant having a critical solution temperature (CST) of between about 30° C. and 150° C.;
   wherein the fracturing fluid has a CST of between about 50° C. and 150° C. and the viscosity of the fracturing fluid composition is temperature sensitive.

2. The fracturing fluid of claim 1, wherein the surfactant is selected from the group consisting of a cationic surfactant, a nonionic surfactant, an anionic surfactant, and a zwitterionic surfactant.

3. The fracturing fluid of claim 2, wherein the anionic surfactant is sodium tetradecyl sulfate.

4. The fracturing fluid of claim 2, wherein the anionic surfactant is sodium hexadecyl sulfate.

5. The fracturing fluid of claim 4, wherein the CST of the fracturing fluid is between about 100° C. and 125° C. in brine.

6. The fracturing fluid of claim 2, wherein the nonionic surfactant is selected from the group consisting of glyceryl laurate, lauryl glucoside, Tween 80, Triton X-100, sorbitan monostearate, sorbitan tristearate, stearyl alcohol, cetostearyl alcohol, poloxamer, and decyl glucoside.

7. The fracturing fluid of claim 2, wherein the zwitterionic surfactant is a betaine.

8. The fracturing fluid of claim 7, wherein the CST of the fracturing fluid is greater than about 93.3° C. (200° F.).

9. The fracturing fluid of claim 8, wherein the viscosity of the fracturing fluid is at least 10000 cP, at 0.1 Pa, at temperatures up to and including 93.3° C. (200° F.).

10. The fracturing fluid of claim 2, wherein the anionic surfactant comprises an alkyl chain length selected from the group consisting of 12 carbons, 14 carbons, 16 carbons, 18 carbons, and 20 or more carbons.

11. The fracturing fluid of claim 1, wherein the surfactant is water soluble at temperatures above the CST of the fracturing fluid.

12. The fracturing fluid of claim 1, wherein the surfactant is water insoluble at temperatures below the CST of the fracturing fluid.

13. The fracturing fluid of claim 1, wherein the hydrophobically associative polymer is a copolymer of one or more water soluble ethylenically unsaturated monomer with one or more water insoluble ethylenically unsaturated monomer.

14. The fracturing fluid of claim 13 wherein the water soluble ethylenically unsaturated monomer is selected from acrylamide, methacrylamide, acrylic acid, methacrylic acid, 2-acrylamidomethylpropanesulfonic acid, N-vinyl pyrrolidone, N-vinyl formamide, and mixtures thereof.

15. The fracturing fluid of claim 13 wherein the water insoluble ethylenically unsaturated monomer having hydrophobic properties is selected from alkyl or alkylaryl alcohol esters of acrylic or methacrylic acid, alkyl or alkylaryl amides of acrylamide or methacrylamide, styrene, butadiene, 1-vinylnaphthalene and mixtures thereof.

16. The fracturing fluid of claim 13, wherein the hydrophobically associative polymer is present at between 0.001 weight percent and 5 weight percent.

17. The fracturing fluid of claim 1 is prepared by micellar polymerization method comprising
   (a) mixing one or more water-insoluble monomers with one or more water-soluble surfactants to form a surfactant solution;
   (b) mixing the surfactant solution with an aqueous solution of one or more water-soluble monomers to form a micellar reaction solution; and
   (c) subjecting the micellar reaction solution to micellar polymerization conditions;
   (d)
      (i) diluting the resulting HAP and surfactant solutions to the fracturing fluid; or
      (ii) (a) drying and grinding the resulting HAP and surfactant solutions into fine powders; and (b) dissolving the fine powders in water to make the fracturing fluids; and
   (e) adding salts into the fracturing fluids of step (d),
   wherein the viscosity of the fracturing fluid is temperature sensitive due to the presence of the one or more water soluble surfactants.

18. The fracturing fluid of claim 1, wherein the CST of the fracturing fluid is between about 100° C. and 125° C.

19. A method for recovering hydrocarbons, the method comprising
   (a) providing a fracturing fluid composition comprising:

(i) a hydrophobically associative polymer (HAP), wherein the polymer is water-soluble, but comprises two or more water-insoluble short blocks; and;
(ii) a surfactant having a critical solution temperature (CST) of between about 30° C. and 150° C.,
(b) injecting/pumping the fracturing fluid composition from a ground surface into a geologic formation/fracture, wherein the temperature of the fracturing fluid is lower than the CST of the surfactant;
(c) allowing the temperature of the fracturing fluid to rise above the CST of the surfactant when the fracturing fluid comes into contact with a hydrocarbon, thereby facilitating the flow of the fracturing fluid to the from the point of contact with the hydrocarbon; and
(d) recovering the hydrocarbon from the geologic formation/fracture at the ground surface.

\* \* \* \* \*